April 17, 1956  M. G. DENTON  2,741,887
BLADE ARRANGEMENTS FOR STALK CUTTERS
Original Filed Feb. 21, 1946
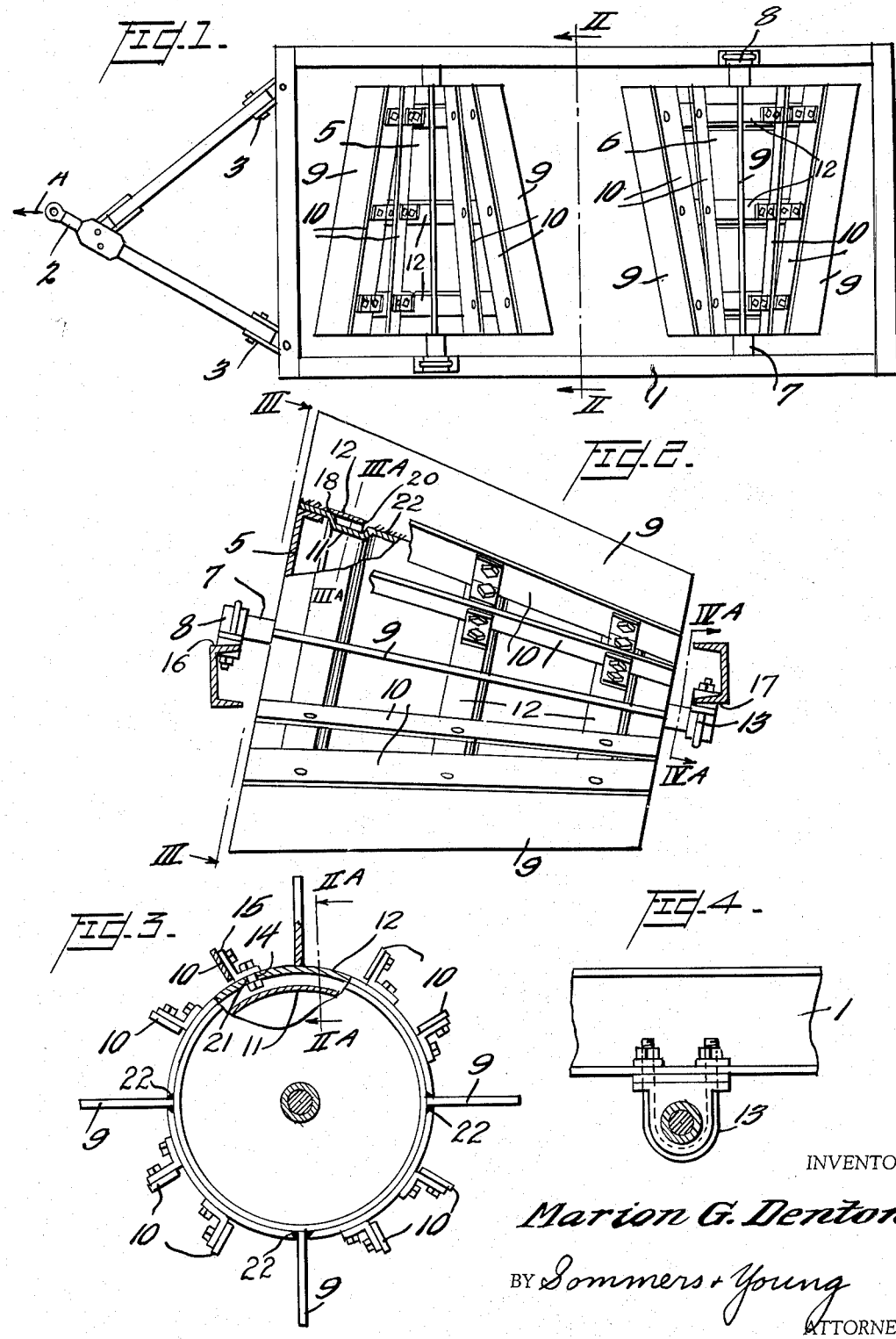
INVENTOR
Marion G. Denton,
BY Sommers + Young
ATTORNEYS

United States Patent Office 2,741,887
Patented Apr. 17, 1956

2,741,887

BLADE ARRANGEMENTS FOR STALK CUTTERS

Marion G. Denton, Auburndale, Fla.

Original application February 21, 1946, Serial No. 649,309, now Patent No. 2,574,468, dated November 13, 1951. Divided and this application October 10, 1951, Serial No. 250,727

2 Claims. (Cl. 55—61)

This application is a division of my application, Serial Number 649,309, filed February 21, 1946, for Stalk Cutters, now Patent No. 2,574,468, granted November 13, 1951.

This invention relates to stalk cutters and has for its object to provide a special arrangement and different sizes of the blades of a stalk cutter.

A further object of this invention is to provide a stalk cutter drum with blades of different heights or widths to thereby provide different amounts of "drop" in operation, thus providing for breaking or chopping of smaller stalks or roots into shorter lengths by the lower and more closely arranged blades, while the larger stalks and roots which can not be severed by the said lower blades are broken into longer lengths by the higher, more widely spaced blades which drop faster and with more power or impact.

Still another object of this invention is to provide a stalk cutter having a set of high, widely spaced blades which are permanently attached to the roller elements of the cutter, and also a set of closely spaced lower blades arranged between said higher blades, circumferentially, around the roller elements and which are removably secured to said elements.

The invention is illustrated by way of example in the accompanying drawing in which:

Figure 1 is a plan view of an embodiment of the machine.

Figure 2 is an enlarged vertical sectional view principally on line II—II of Figure 1, but having part of one of the drums broken away in section on line IIA—IIA of Figure 3 to show the attachment of a permanently attached blade.

Figure 3 is an enlarged vertical sectional view principally on line III—III of Figure 2, but with the drum partially broken away in section on line IIIA—IIIA of Figure 2 to show attachment of the removable blades.

Figure 4 is a further enlarged sectional view on line IV—IV of Figure 2 showing the attachment of an axle to the underneath side of the frame.

In the accompanying drawing, numeral 1 refers to a frame of the machine which may be rectangular in shape and may be constituted by a set of channel-beams connected at their ends to form a rectangle. At one end a draft means 2 is provided for attachment of a tractor or the like for drawing the machine over the ground approximately, at least, in the longitudinal direction of extent of the rectangular frame. Preferably, the draft means is hingedly connected to the frame at 3 to allow for relative movement between the draft means and frame due to irregularity in the ground. The frame is usually approximately horizontal and within its interior there are located a pair of oppositely arranged conically shaped roller elements or center members 5 and 6. These elements may be in the form of hollow drums which are closed at their ends. Each of the drums 5 and 6 is provided with an axle 7, and in order to allow for the difference in height of the different ends of the axles, the higher ends are connected to the frame 1 by bearings 8 which are mounted on the upper side 16 of the channels of which the frame is constituted, and the lower ends are mounted in bearings 13 which are secured to the lower sides 17 of the channels.

On the outer surfaces of the drums there are arranged a plurality of blades 9 which have considerable height or width. These blades are permanently secured to the outer surface of the conical drums, for instance, by welding 22, and the blades extend, in general, radially. Further blades 10 are also secured to the surface of the conical drums at angularly spaced positions between the permanently secured blades 9. These further blades 10 may be of less height or width than the blades 9, and the number of these additional blades can be altered at will.

In order to provide for removable attachment of these additional blades 10 the surface of the drum is provided with a plurality of grooves 11 extending circumferentially about the drums and over these grooves are arranged hoops or bands 12 which may be secured at one of their edges to the drums at the edges of said grooves, for instance, by welding 18. These hoops or bands do not extend entirely across the grooves, but their edges are slightly spaced from the edges of the grooves opposite the welded connections, as indicated at 20, so as to provide access to the underside of the hoops or bands. These bands are provided with a plurality of openings 21 for accommodating bolts 14 or the like for the attachment of brackets 15 to which the additional blades are secured. The number and position of these openings through the hoops is immaterial and can be varied to suit the existing conditions.

In operation the machine with the desired blades secured to the drums is drawn over the ground in the direction of the arrow A and as this occurs the blades mounted on the drums press into the ground. Since the lower blades 10 which are arranged between the higher blades 9, are disposed closer to each other and closer to the next adjacent higher blade, considered circumferentially, than are the higher blades, they will strike the ground with less speed and power or impact than the higher blades, but they, nevertheless, serve their purpose of chopping or cutting the smaller stalks and roots into short lengths. On the other hand the higher blades 9 receive their principal lift and drop by reason of their more distant circumferential spacing from the next adjacent high blade and thus drop with considerably greater speed and impact than the lower blades 10, and serve to chop and break the larger stalks and roots into longer lengths than the smaller ones are broken. It is to be noted, however, that although the lower blades 10 will not strike the ground with as great speed and force or impact, as the higher blades 9, they will, nevertheless, strike with greater speed and force than if the higher blades were not provided, since the centers or axes about which their drop pivots are located in the higher blades 9 which provides higher drop.

I claim:

1. An agricultural machine for working the soil and cutting stalks and roots comprising a drum having an axle, draft means in which said axle is mounted for rolling said drum over the ground, said drum being provided with blades secured to its outer circumferential surface with each of said blades extending substantially in a plane of said axle and having their flat faces arranged substantially radially of said axle, said blades being comprised of two sets of blades, the blades of the first set being of greater width than the blades of the second set so as to stand out from the surface of said drum with greater radial height, the blades of said first set being arranged around said drum in circumferentially spaced relationship, the blades of said second set being narrower than those of said first set and standing out from said drum with less radial height than the blades of said first set, the blades of said second set being arranged in circumferentially spaced relationship around the circumference of said drum, between the blades of said first set in circumferentially spaced relationship thereto, whereby, the blades of said first set operate with drop centered in the preceding high blade, and therefore with great speed and force, to sever large stalks and roots into lengths corresponding to the circumferential spacing of said high blades, while said lower blades also operate with drop centered in the preceding high blade, but with less speed and force than the high blades, to sever smaller stalks and roots into shorter lengths.

2. A machine according to claim 1 and in which the blades of one of said sets of blades are permanently secured to said drum while the blades of said other set are removably secured thereto.

References Cited in the file of this patent
UNITED STATES PATENTS

| | | |
|---|---|---|
| 1,043,239 | Lee | Nov. 5, 1912 |
| 1,887,818 | Michalka | Nov. 15, 1932 |
| 2,151,918 | Ingram | Mar. 28, 1939 |
| 2,558,241 | Eller | June 26, 1951 |
| 2,574,468 | Denton | Nov. 13, 1951 |